(12) United States Patent
Monteiro et al.

(10) Patent No.: US 11,113,844 B2
(45) Date of Patent: Sep. 7, 2021

(54) SYSTEMS AND METHODS FOR AUTOMATIC QUALITY ASSESSMENT OF MULTIPLE-CAMERA CALIBRATION

(71) Applicant: The Boeing Company, Chicago, IL (US)

(72) Inventors: Sildomar T. Monteiro, Huntsville, AL (US); Willaredt E. Hardy, Greenwich, CT (US); Anthony W. Baker, Gilbertsville, PA (US)

(73) Assignee: The Boeing Company, Chicago, IL (US)

( * ) Notice: Subject to any disclaimer, the term of this patent is extended or adjusted under 35 U.S.C. 154(b) by 2 days.

(21) Appl. No.: 16/695,791

(22) Filed: Nov. 26, 2019

(65) Prior Publication Data

US 2021/0158568 A1 May 27, 2021

(51) Int. Cl.

| | |
|---|---|
| *G06T 7/20* | (2017.01) |
| *G06T 7/80* | (2017.01) |
| *H04N 13/246* | (2018.01) |
| *G06K 9/46* | (2006.01) |
| *G06T 17/00* | (2006.01) |
| *G06K 9/62* | (2006.01) |

(52) U.S. Cl.
CPC ............... *G06T 7/85* (2017.01); *G06K 9/46* (2013.01); *G06K 9/6201* (2013.01); *G06T 17/00* (2013.01); *H04N 13/246* (2018.05); *G06T 2200/08* (2013.01); *G06T 2207/10028* (2013.01)

(58) Field of Classification Search
CPC . G06T 7/85; G06T 17/00; G06T 2207/10028; G06T 2200/08; G06K 9/6201; G06K 9/46; H04N 13/246
See application file for complete search history.

(56) References Cited

U.S. PATENT DOCUMENTS

| | | |
|---|---|---|
| 9,305,378 B1 | 4/2016 | Holmes et al. |
| 10,102,773 B2 | 10/2018 | Towers et al. |
| 10,127,658 B2 | 11/2018 | Lee |
| 10,127,691 B2 | 11/2018 | Lee |
| 10,298,910 B1 * | 5/2019 | Kroeger ............ G06K 9/00791 |

(Continued)

OTHER PUBLICATIONS

Zhengyou Zhang; A Flexible New Technique for Camera Calibration; IEEE Transactions on Pattern—Analysis and Machine Intelligence, vol. 22, No. 11 Nov. 2000.

(Continued)

*Primary Examiner* — Howard D Brown, Jr.
(74) *Attorney, Agent, or Firm* — Parsons Behle & Latimer (57) ABSTRACT

Systems and methods for assessing the calibration of an array of cameras. The method including inputting into a processor captured images from at least two cameras of the array of cameras, the captured images having features from an image. The method further including extracting one or more extracted features from the captured images, matching one or more extracted features between pairs of the at least two cameras to create a set of matched features, selecting matching points from the set of matched features, generating a three-dimensional reconstruction of objects in a field of view of the at least two cameras, and outputting the three-dimensional reconstruction wherein the three-dimensional reconstruction comprises indicators of calibration errors.

20 Claims, 6 Drawing Sheets

(56) References Cited

U.S. PATENT DOCUMENTS

| | | | |
|---|---|---|---|
| 10,880,667 B1* | 12/2020 | Cho | H04R 5/033 |
| 2009/0086081 A1* | 4/2009 | Tan | G01B 11/2509 |
| | | | 348/333.1 |
| 2014/0347486 A1* | 11/2014 | Okouneva | H04N 5/247 |
| | | | 348/148 |
| 2015/0324658 A1 | 11/2015 | Zhang et al. | |
| 2016/0266256 A1 | 9/2016 | Allen et al. | |
| 2016/0353068 A1* | 12/2016 | Ishikawa | H04N 9/3185 |
| 2017/0052070 A1 | 2/2017 | Marsh et al. | |
| 2017/0118409 A1* | 4/2017 | Im | H04N 5/23258 |
| 2017/0210011 A1 | 7/2017 | Hull | |
| 2017/0219336 A1 | 8/2017 | Kurtz et al. | |
| 2017/0353670 A1* | 12/2017 | Zimmer | G06T 7/143 |
| 2018/0249142 A1* | 8/2018 | Hicks | H04N 17/002 |
| 2018/0330149 A1 | 11/2018 | Uhlenbrock et al. | |
| 2020/0005489 A1* | 1/2020 | Kroeger | G06K 9/4604 |
| 2020/0282929 A1* | 9/2020 | Kroeger | G06T 7/80 |

OTHER PUBLICATIONS

Ethan Rublee et al; ORB: an efficient alternative to SIFT or SURF; IEEE International Conference on Computer Vision 2011.

Marius Muja et al; Fast Approximate Nearest Neighbors With Automatic Algorithm Configuration (2019).

Heiko Hirschmüller; Stereo Processing by Semiglobal Matching and Mutual Information; IEEE Transactions on Pattern Analysis and Machine Intelligence, vol. 30, No. 2, Feb. 2008.

Ryo Furukawa et al; Multiview Projectors/Cameras System for 3D Reconstruction of Dynamic Scenes (2011).

JiaWang Bian et al; GMS: Grid-based Motion Statistics for Fast, Ultra-robust Feature Correspondence; 2017 IEEE Conference on Computer Vision and Pattern Recognition (2017).

Oleksandr Bailo et al; Efficient adaptive non-maximal suppression algorithms for homogeneous spatial keypoint distribution; School of Electrical Engineering, KAIST, Daejeon 34141, Republic of Korea; Pattern Recognition Letters 106 53-60 2018 (2018).

* cited by examiner

SYSTEMS AND METHODS FOR AUTOMATIC QUALITY ASSESSMENT OF MULTIPLE-CAMERA CALIBRATION

FIELD OF THE DISCLOSURE

This disclosure relates generally to systems and methods for evaluating the calibration of multiple cameras. More particularly, this disclosure relates to systems and methods for automatically assessing the quality of calibration for multiple camera systems.

BACKGROUND

In some environments, such as aircraft manufacturing, it is often desirable to use optical imaging systems (e.g., cameras) to evaluate components or assemblies during manufacture. It is often necessary to calibrate the cameras to ensure, among other things, that they are functioning as desired. Additionally, it is often desirable to have an assessment or quality check of the calibration. Current approaches for a calibration quality check require the use of calibration boards and running an entire calibration procedure. The conventional procedure is laborious and time consuming because it typically requires positioning a calibration board at numerous locations and orientations in the field of view of the cameras. Processing calibration board data typically takes several hours of computing time due to, among other things, the number of poses and high image resolution. Other drawbacks, inconveniences, and issues with current calibration quality checks also exist.

SUMMARY

Accordingly, disclosed systems and methods address the above-noted and other drawbacks, inconveniences, and issues of current systems and methods. Disclosed embodiments include a method for assessing the calibration of an array of cameras, the method including inputting captured images from at least two cameras of the array of cameras, the captured images having features from an image. The method includes extracting one or more extracted features from the captured images, matching one or more extracted features between pairs of the at least two cameras to create a set of matched features, selecting matching points from the set of matched features, generating a three-dimensional reconstruction of objects in a field of view of the at least two cameras, and outputting the three-dimensional reconstruction wherein the three-dimensional reconstruction comprises indicators of calibration errors.

The method may also include extracting one or more extracted features using ORB (Oriented FAST (Features from Accelerated Segment Test) and Rotated BRIEF (Binary Robust Independent Elementary Features) feature detection, using SURF (Speeded Up Robust Features) feature detection, selecting a subset of candidate features to extract and extracting using ANMS (Adaptive Non-Maximal Suppression) feature detection, or extracting using ANMS feature detection with SSC (Suppression via Square Covering) feature detection.

The method may also include matching one or more extracted features by matching through brute force matching, or by matching through Fast Library for Approximate Nearest Neighbors (FLANN) approximate matching.

The method may also include selecting matching points from the set of matched features by selecting matching points based on a distance ratio and applying a homography transform with RANSAC (RANdom SAmple Consensus).

The method may also include generating a three-dimensional reconstruction by producing a three-dimensional point cloud and producing a reconstruction error rate. The method may further include outputting the three-dimensional point cloud or outputting the reconstruction error rate. Embodiments of the method may include outputting the three-dimensional reconstruction by outputting a visualization of the matched features and wherein the indicators of calibration errors are indicated by lines.

In some embodiments, the method may also include projecting the image onto the objects in the field of view of the at least two cameras.

Also disclosed is a system for assessing the calibration of an array of cameras, the system including at least one processor and a memory storing a set of instructions that when executed by the processor cause the processor to initiate operations including inputting captured images from at least two cameras of the array of cameras, the captured images having features from an image, extracting one or more extracted features from the captured images, matching one or more extracted features between pairs of the at least two cameras to create a set of matched features, selecting matching points from the set of matched features, generating a three-dimensional reconstruction of objects in a field of view of the at least two cameras, and outputting the three-dimensional reconstruction wherein the three-dimensional reconstruction comprises indicators of calibration errors.

In some embodiments, the system may also include a projector for projecting the image onto the objects in the field of view of the at least two cameras.

Other embodiments are also disclosed.

DETAILED DESCRIPTION

Figure 1:
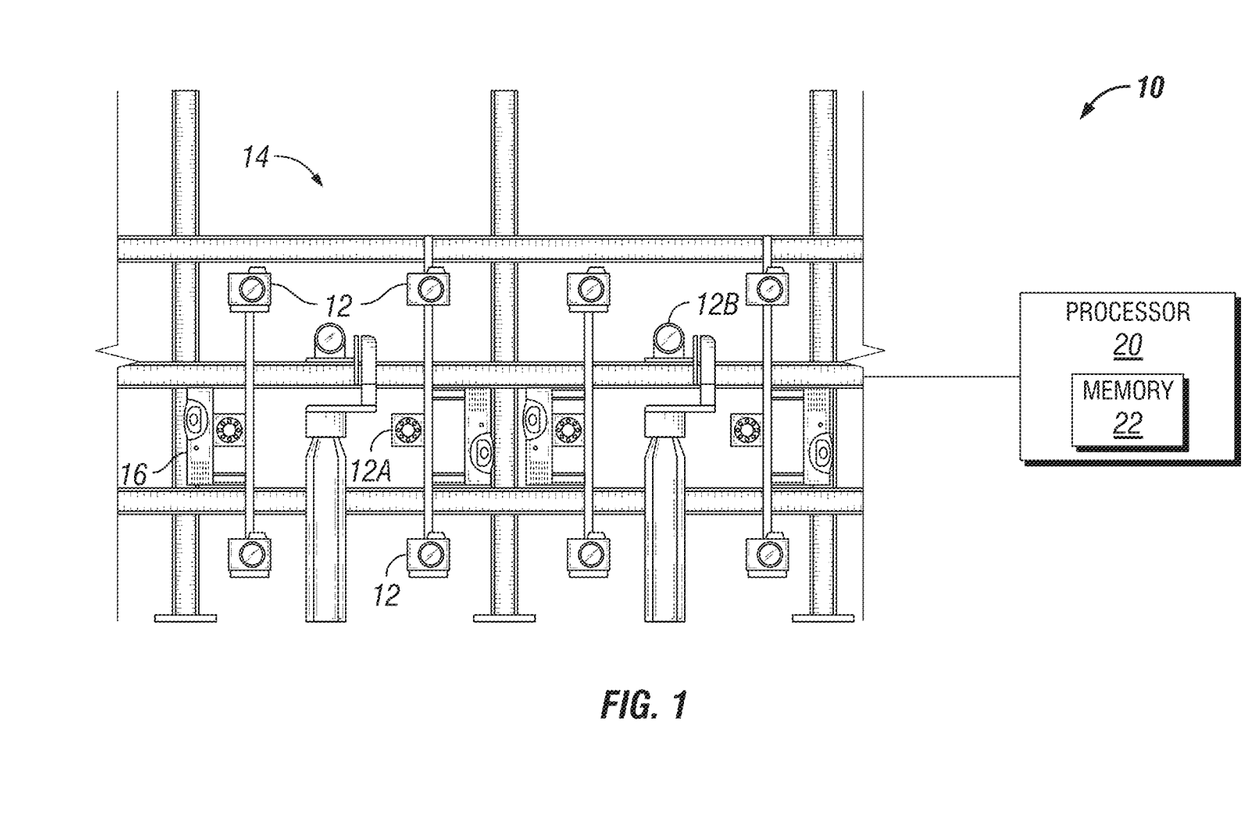
FIG. 1 is a schematic illustration of a system for evaluating the calibration of cameras mounted on a pylon wall in accordance with disclosed embodiments.

FIG. 1 is an illustration of a system 10 for evaluating the calibration of cameras 12 mounted on a pylon wall 14 in accordance with disclosed embodiments. As also indicated schematically, system 10 also includes processor 20. Processor 20 may include a memory 22 or may communicate with other memory devices. Embodiments of system 10 may optionally include one or more projectors 16.

Cameras 12 as used herein refer to imaging devices and may comprise visible imaging devices (e.g., Single Lens Reflex (SLR) cameras, digital cameras, and the like), non-visible imaging device (e.g., Infrared (IR) or heat-imaging cameras), structured or laser-light imaging devices (e.g., Time-of-flight (ToF) imaging devices), Spatial Phase Imaging (SPI) devices (e.g., 3D sensing devices), or the like. For example, system 10 may include one or more ToF cameras 12A and one or more SPI cameras 12B. Other cameras 12 may also be used.

Embodiments of pylon wall 14 may include a generally open, multiple post or column structure, a solid panel, or the like to support the cameras 12 and, optionally, projectors 16. Pylon wall 14 may be movable, tilt, rotate, extend, or the like as desired. In some embodiments, pylon wall 14 may be positionable under the control of processor 20 or a separate positioning system (not shown).

Figure 2:
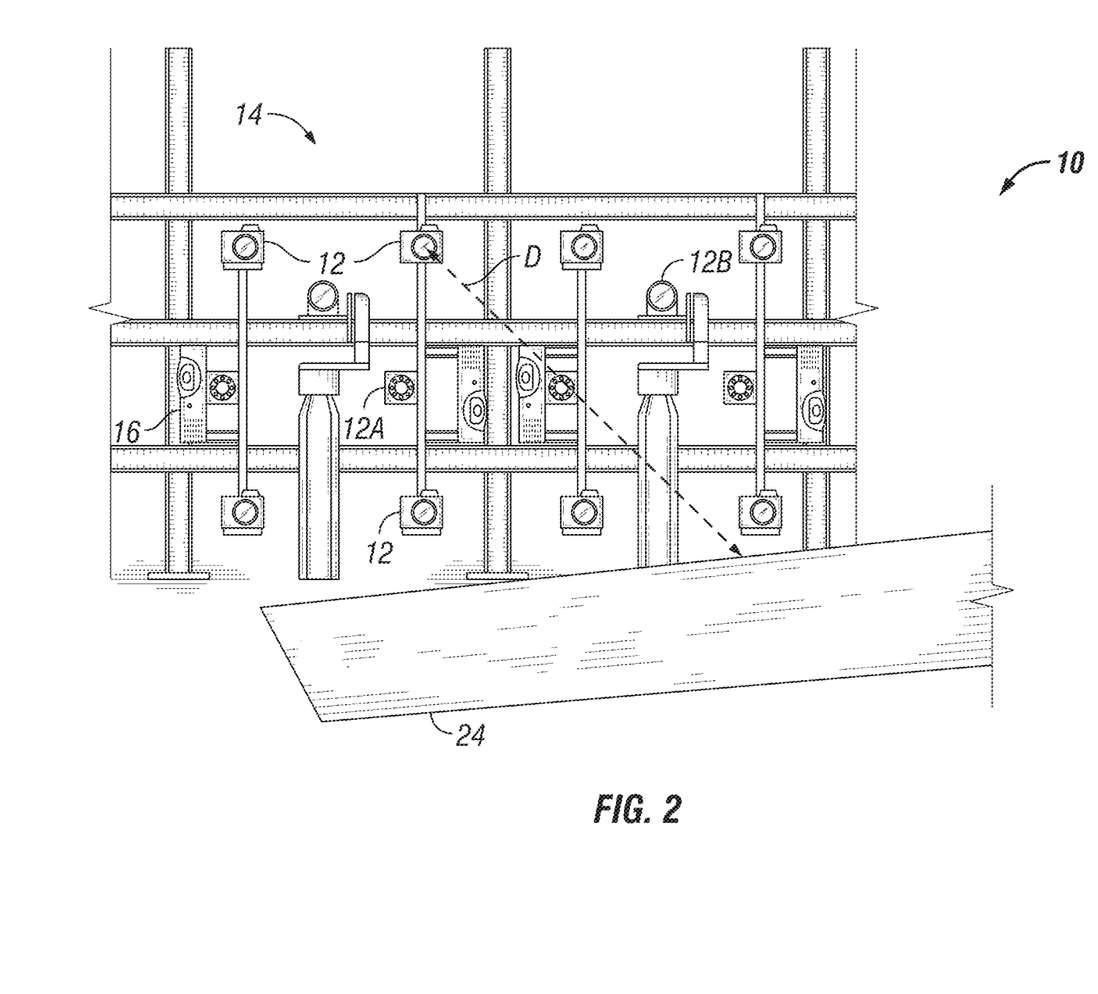
FIG. 2 is a schematic illustration of pylon wall positioned to capture images of an object in accordance with disclosed embodiments.

Pylon wall 14 is positioned to capture images of whatever object is being inspected or evaluated. For example, FIG. 2 is an illustration of pylon wall 14 positioned to capture images of a horizontal stabilizer 24 that forms part of a wing structure in an aircraft. For relatively large objects, such as horizontal stabilizer 24, the pylon wall 14 may span approximately forty feet. Additionally, by adjusting the distance "D" between the pylon wall 14 and the object (horizontal stabilizer 24 in FIG. 2) the imaging field of view and surface coverage can be varied. Of course, other objects of other sizes may also be evaluated using system 10.

Processor 20 is a suitable processor-based computing device, such as a personal computer (PC), laptop computer, tablet, or the like. As indicated in FIG. 1, processor 20 may include a memory 22 capable of storing instructions that when executed by the processor 20 initiate the operations disclosed herein. Processor 20 and memory 22 may be stand-alone devices, may be distributed or otherwise networked devices, or may be combinations of the foregoing.

Figure 3:
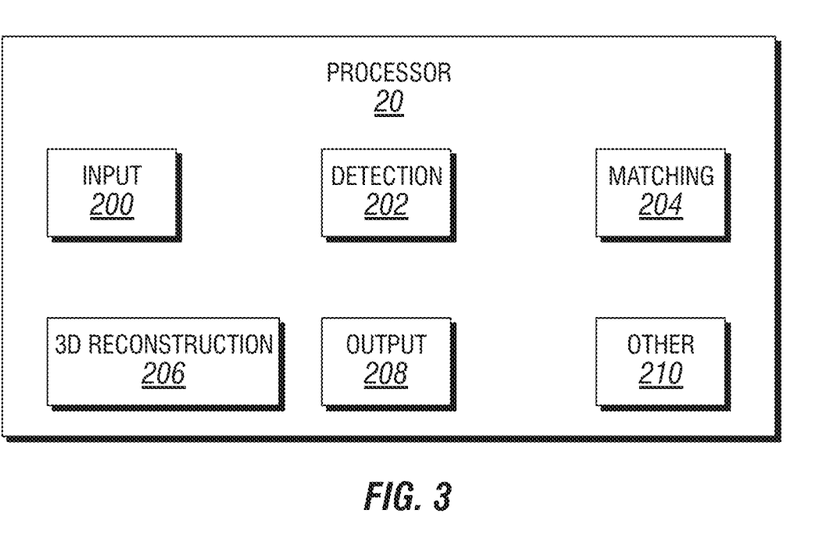
FIG. 3 is a schematic illustration of processor and associated program components to initiate the operations disclosed herein.

FIG. 3 is a schematic illustration of processor 20 and associated program components to initiate the operations disclosed herein. As indicated processor 20 includes an input component 200 for receiving images captured by cameras 12 into processor 20. Detection component 202 detects features present in the images. Matching component 204 matches detected features. 3D reconstruction component 206 generates a calibration assessment 3D visualization of the object being imaged. Output component 208 outputs various reproductions or visualizations to appropriate displays or other output devices (e.g., printers or the like). Processor 20 may also include other components 210 as indicated.

Figure 4:
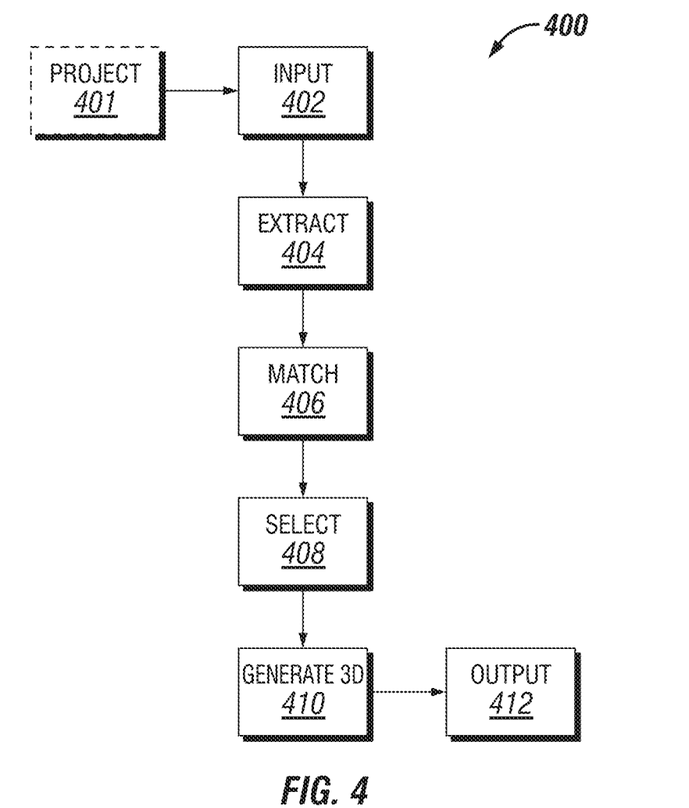
FIG. 4 is a schematic illustration of methods for calibration quality assessment in accordance with disclosed embodiments.

FIG. 4 is a schematic illustration of methods for calibration quality assessment in accordance with disclosed embodiments. As indicated, method 400 initiates at 402 with the inputting of captured images from the array of cameras 12 on the pylon wall 14. Input component 200 handles the transfer of data from the cameras 12 to processor 20.

Each image includes features of the view captured by the cameras 12. For example, if the observed object in the view of the cameras 12 contains naturally visible features such as shapes, colors, contours, or the like, that are visible, those features are captured in the images. Alternatively, if the observed object in the view of cameras 12 is relatively lacking in naturally visible features (e.g., horizontal stabilizer 24 is relatively monochromatic and featureless) then, as indicated at 401 patterns containing visible features may be projected onto the observed object.

Figure 5:
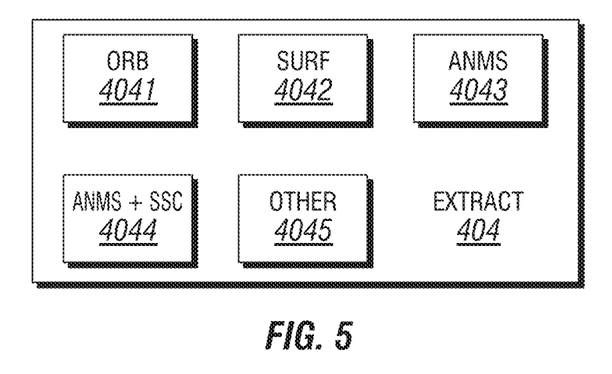
FIG. 5 is a schematic illustration of feature extraction step 404 and associated program components in accordance with disclosed embodiments.

As indicated at 404 features are extracted from the images by detection component 202 of processor 20. Extraction step 404 may be accomplished by processor 20 in a number of ways. For example, as schematically indicated in FIG. 5, extraction step 404 may be accomplished using ORB (Oriented FAST (Features from Accelerated Segment Test) and Rotated BRIEF (Binary Robust Independent Elementary Features) feature detection 4041, using SURF (Speeded Up Robust Features) feature detection 4042, selecting a subset of candidate features to extract and extracting using ANMS (Adaptive Non-Maximal Suppression) feature detection 4043, using ANMS feature detection and also using SSC (Suppression via Square Covering) feature detection 4044, or extracting by some other feature detection routine 4045.

Figure 6:
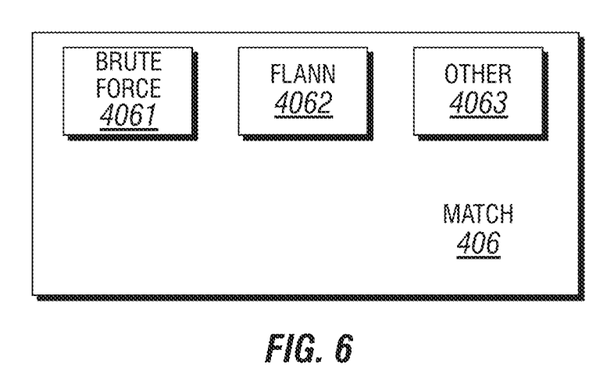
FIG. 6 is a schematic illustration of feature matching step 406 and associated program components in accordance with disclosed embodiments.

As indicated in FIG. 4, after features are extracted at extraction step 404 they are then matched in matching step 406. Matching step 406 may be accomplished by processor 20 in a number of ways. For example, as schematically indicated in FIG. 6, matching step 406 may be accomplished matching through brute force matching 4061 of the extracted features (e.g., comparing each extracted feature to all the other extracted features to find a match), matching through Fast Library for Approximate Nearest Neighbors (FLANN) approximate matching 4062, or matching through other matching routines 4063.

Figure 7:
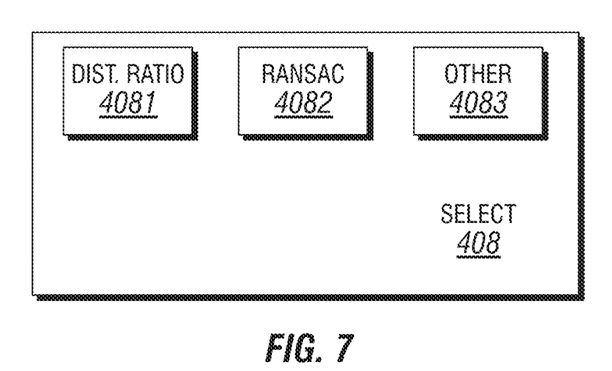
FIG. 7 is a schematic illustration of feature selection step 408 and associated program components in accordance with disclosed embodiments.

As indicated in FIG. 4, after matching step 406 a subset of matched features are selected during selection step 408. Selection step 408 may be accomplished by processor 20 in a number of ways. For example, as schematically indicated in FIG. 7, selection step 408 includes selecting matching points based on a distance ratio 4081 and applying a homography transform with RANSAC (RANdom SAmple Consensus) 4082. Other selection routines 4083 may also be used.

As indicated in FIG. 4, after selection step 408 a three-dimensional (3D) reconstruction of the observed object is generated at generation step 410. The 3D reconstruction uses the current extrinsic calibration parameters (as described herein). The 3D reconstruction generation step 410 produces a 3D point cloud and a reconstruction error rate.

Figure 8:
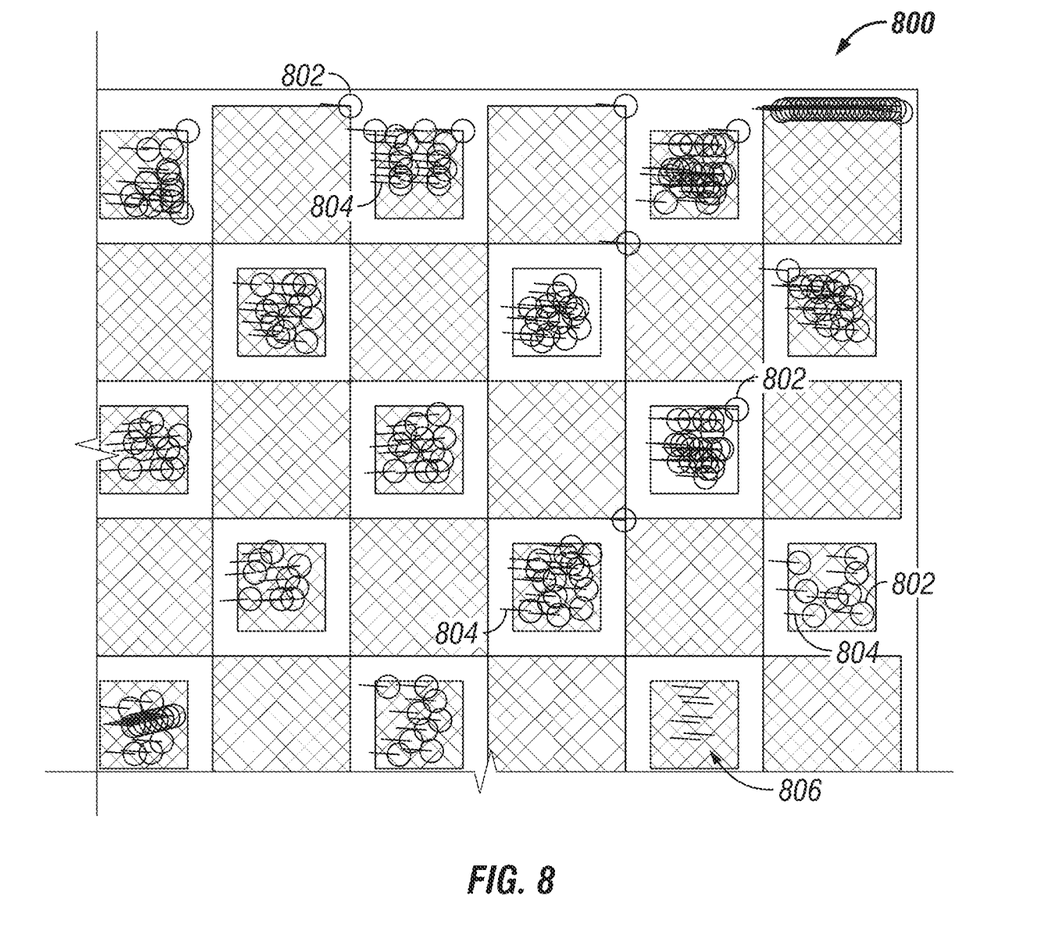
FIG. 8 is an exemplary representation of a visualization of selected features and corresponding matches in each image, in which the calibration error amount is indicated visually in accordance with disclosed embodiments.

As indicated in FIG. 4, after the 3D reconstruction generation step 410 there is an output step 412. Outputs may include a visualization of selected features and corresponding matches in each image, in which the calibration error amount is indicated visually (e.g., by colored lines or the like). FIG. 8 is an exemplary representation of a visualization 800 of selected features and corresponding matches in each image, in which the calibration error amount is indicated visually. In the visualization 800 shown in FIG. 8, circles 802 indicate feature locations and solid lines 804 indicate errors in calibration. If the calibration is good, there should only be dots visible inside the circles 802, not lines 804, with the exception that scattered, single solid lines 806 may be matching errors, not calibration errors. FIG. 8 is an example of poor calibration as indicated by the numerous solid lines 804. Exemplary good calibration would show only circles 802 with a dot in the middle of each of the circles 802.

Output step 412 may also output a 3D point cloud obtained from the 3D reconstruction routine in step 410. Additionally, output step 410 may output the 3D reprojection error generated by the 3D reconstruction generation step 410. The reprojection error may by output as a Pose_error.csv file and can provide a more quantitative indication of the calibration error. However, a small reprojection error is a necessary, but not sufficient, condition to ensure a good calibration and there are cases where a bad calibration may still have a small reprojection error (e.g., if the matching features are sparse).

Figure 9:
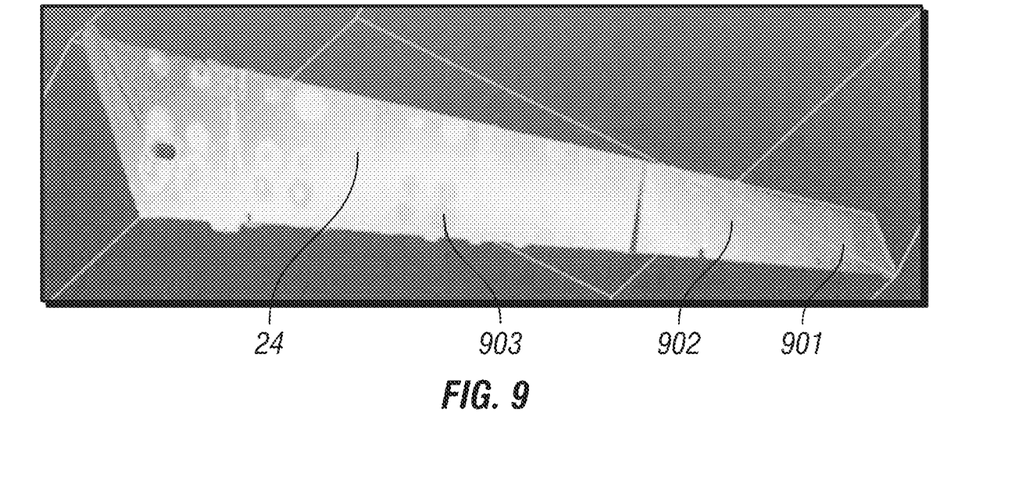
FIG. 9 is an exemplary representation of a visualization of a 3D reconstruction in accordance with disclosed embodiments.

FIG. 9 is an exemplary representation of a visualization of a 3D reconstruction in accordance with disclosed embodiments. As shown in FIG. 9, the observed object is a horizontal stabilizer 24 (as seen in FIG. 2) and the shaded areas 901, 902, indicate the sparser 3D point cloud closer to the border of the observed object (e.g., stabilizer 24) and the circled regions 903 indicate a higher density point cloud resulting of the 3D reconstruction from multiple overlapping images at the center of the observed object (e.g., stabilizer 24).

Figure 10:
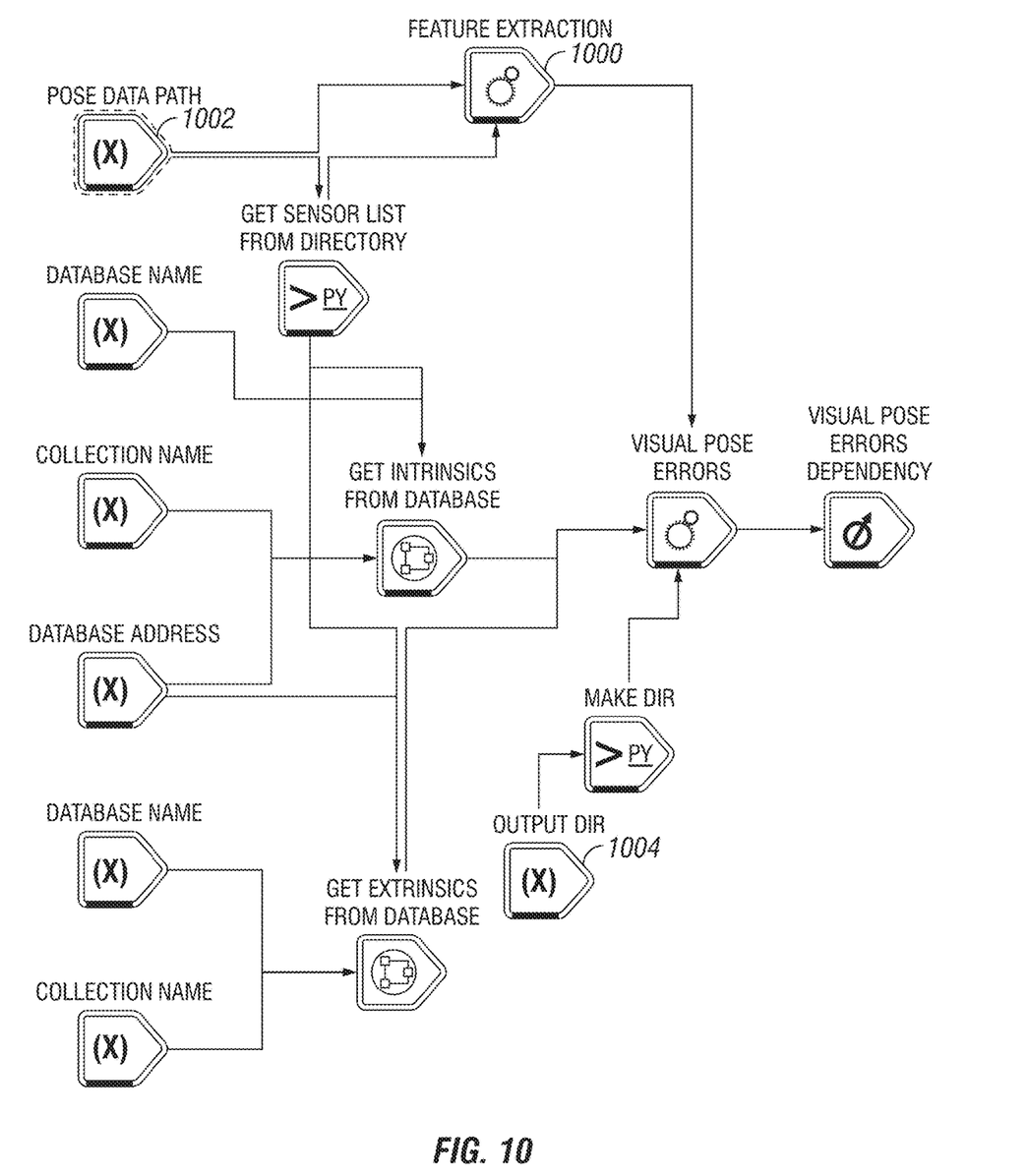
FIG. 10 is a schematic workflow diagram for feature extraction in accordance with disclosed embodiments.

FIG. 10 is a schematic workflow diagram for feature extraction (e.g., step 404) in accordance with disclosed embodiments. The feature detection and matching may be implemented in any suitable programming language, such as C++. It may also be integrated to be used as a single workflow framework platform (such as Workspace or the like) function called Feature Extraction 1000. Workspace is software developed by CSIRO in Australia (https://research.csiro.au/workspace/). The workflow for running the feature extraction is shown in FIG. 10. The user selects an input directory (Pose Data Path) 1002 for the image set and an output directory (Output Dir) 1004 to save the output images and 3D reconstruction files.

The Feature Extraction function 1000 has several parameters that can be tuned for a specific image set. Default parameters are provided but the user can change the parameters directly in Workspace. The following paragraphs are a description of some of the tunable parameters.

Nfeatures: Maximum number of features to be detected. Recommendation: 150000 to 300000. Default: 150000.

ScaleFactor: ORB detector's pyramid decimation ratio. Recommendation: 1 to 2. Default: 1.2.

Nlevels: ORB detector's number of pyramid levels. Recommendation: 8 to 16. Default: 8.

FastThreshold: ORB detector's FAST threshold. Recommendation: 0 to 20. Default: 8.

ReturnPtsRatio: Percentage of max number of features to retain in the non-maximal suppression algorithm. Recommendation: 0.1 to 1 (one keeps all features). Default: 0.4.

MatchRatio: Maximum distance between the best and second-best match to reject low-quality matches. Recommended: 0.5 to 0.8. Default: 0.7.

RansacReprojThreshold: Maximum reprojection error to reject points as outliers. Recommended: 1 to 10. Default: 4.

The procedure for calibration assessment makes use of the output of the algorithm. Qualitatively, each matching feature should have a corresponding feature in the same location in the other images.

Although various embodiments have been shown and described, the present disclosure is not so limited and will be understood to include all such modifications and variations would be apparent to one skilled in the art.

What is claimed is:

1. A method for assessing calibration of an array of cameras, the method comprising:
   inputting captured images from at least two cameras of the array of cameras, the captured images comprising features from an image;
   extracting one or more extracted features from the captured images;
   matching one or more extracted features between pairs of the at least two cameras to create a set of matched features;
   selecting matching points from the set of matched features by:
     selecting matching points based on a distance ratio; and
     applying a homography transform with RANSAC (RANdom SAmple Consensus);
   generating a three-dimensional reconstruction of objects in a field of view of the at least two cameras; and
   outputting the three-dimensional reconstruction wherein the three-dimensional reconstruction comprises indicators of calibration errors.

2. The method of claim 1 wherein the step of extracting one or more extracted features further comprises extracting using at least one of:
   ORB (Oriented FAST (Features from Accelerated Segment Test) and Rotated BRIEF (Binary Robust Independent Elementary Features)) feature detection; and
   SURF (Speeded Up Robust Features) feature detection.

3. The method of claim 1 wherein the step of extracting one or more extracted features further comprises:
   selecting a subset of candidate features to extract; and
   extracting using ANMS (Adaptive Non-Maximal Suppression) feature detection.

4. The method of claim 3 wherein the step of extracting using ANMS feature detection further comprises extracting using SSC (Suppression via Square Covering) feature detection.

5. The method of claim 1 wherein the step of matching one or more extracted features further comprises at least one of:
   matching through brute force matching; and
   matching through Fast Library for Approximate Nearest Neighbors (FLANN) approximate matching.

6. The method of claim 1 wherein the step of generating a three-dimensional reconstruction further comprises:
   producing a three-dimensional point cloud; and
   producing a reconstruction error rate.

7. The method of claim 6 wherein the step of outputting the three-dimensional reconstruction further comprises at least one of:
   outputting the three-dimensional point cloud;
   outputting the reconstruction error rate; and
   outputting a visualization of the matched features and wherein the indicators of calibration errors further comprise lines.

8. The method of claim 1 further comprising:
   projecting the image onto the objects in the field of view of the at least two cameras.

9. A system for assessing calibration of an array of cameras, the system comprising:
   at least one processor; and a memory storing a set of instructions that when executed by the processor cause the processor to initiate operations comprising:
inputting captured images from at least two cameras of the array of cameras, the captured images comprising features from an image;
extracting one or more extracted features from the captured images;
matching one or more extracted features between pairs of the at least two cameras to create a set of matched features;
selecting matching points from the set of matched features by:
selecting matching points based on a distance ratio; and
applying a homography transform with RANSAC (RANdom SAmple Consensus);
generating a three-dimensional reconstruction of objects in a field of view of the at least two cameras; and
outputting the three-dimensional reconstruction wherein the three-dimensional reconstruction comprises indicators of calibration errors.

10. The system of claim 9 wherein the operation of extracting one or more extracted features further comprises at least one of:
extracting using ORB (Oriented FAST (Features from Accelerated Segment Test) and Rotated BRIEF (Binary Robust Independent Elementary Features)) feature detection; and
extracting using SURF (Speeded Up Robust Features) feature detection.

11. The system of claim 9 wherein the operation of extracting one or more extracted features further comprises:
selecting a subset of candidate features to extract; and
extracting using ANMS (Adaptive Non-Maximal Suppression) feature detection.

12. The system of claim 11 wherein the operation of extracting using ANMS feature detection further comprises extracting using SSC (Suppression via Square Covering) feature detection.

13. The system of claim 9 wherein the operation of matching one or more extracted features further comprises at least one of:
matching through brute force matching; and
matching through Fast Library for Approximate Nearest Neighbors (FLANN) approximate matching.

14. The system of claim 9 wherein the operation of generating a three-dimensional reconstruction further comprises:
producing a three-dimensional point cloud; and
producing a reconstruction error rate.

15. The system of claim 14 wherein the operation of outputting the three-dimensional reconstruction further comprises at least one of:
outputting the three-dimensional point cloud;
outputting the reconstruction error rate; and
outputting a visualization of the matched features and wherein the indicators of calibration errors further comprise lines.

16. The system of claim 9 further comprising:
a projector for projecting the image onto the objects in the field of view of the at least two cameras.

17. The system of claim 9 wherein the operation of extracting one of more extracted features further comprises executing a feature extraction function with one or more variable parameters.

18. The system of claim 17 wherein the one or more variable parameters comprise at least one of:
a maximum number of features to be detected;
an ORB (Oriented FAST (Features from Accelerated Segment Test) and Rotated BRIEF (Binary Robust Independent Elementary Features)) detector pyramid decimation ratio;
an ORB detector number of pyramid levels;
an ORB detector FAST threshold;
a percentage of maximum number of features to retain in an ANMS (Adaptive Non-Maximal Suppression) algorithm;
a maximum distance between the best and second-best match; and
a maximum reprojection error to reject points as outliers.

19. The method of claim 7 wherein the step of outputting a visualization of the matched features comprises using circles to indicate matched feature locations.

20. The system of claim 15 wherein outputting a visualization of the matched features comprises using circles to indicate matched feature locations.

* * * * *